US005242734A

United States Patent [19]

Rubin

[11] Patent Number: 5,242,734
[45] Date of Patent: Sep. 7, 1993

[54] INFORMATION-CONVEYING PROTECTIVE STRIP ASSEMBLY

[76] Inventor: Richard J. Rubin, P.O. Box 1104, York Harbor, Me. 03911

[21] Appl. No.: 796,264

[22] Filed: Nov. 19, 1991

[51] Int. Cl.[5] .......... E04F 19/02; B60J 11/00

[52] U.S. Cl. .......... 428/100; 428/31; 428/690; 293/128; 52/717.05; 52/718.05

[58] Field of Search .......... 428/31, 13, 99, 100, 428/690; 293/128; 52/716, 718.1

[56] References Cited

U.S. PATENT DOCUMENTS

| | | | |
|---|---|---|---|
| 4,083,592 | 4/1978 | Rubin et al. | 293/62 |
| 4,775,559 | 10/1988 | Kanamori | 428/31 |
| 4,808,451 | 2/1989 | McCue et al. | 428/31 |
| 4,911,959 | 3/1990 | Miyakawa | 293/128 |
| 4,911,971 | 3/1990 | McCue et al. | 428/99 |
| 4,948,637 | 8/1990 | Kessler | 428/57 |
| 5,013,596 | 5/1991 | Kessler | 428/100 |
| 5,033,244 | 7/1991 | Ullman | 52/288 |
| 5,085,902 | 2/1992 | Yada et al. | 428/31 |

FOREIGN PATENT DOCUMENTS

| | | | |
|---|---|---|---|
| 331393 | 8/1958 | Fed. Rep. of Germany | 428/100 |
| 331393 | 8/1958 | Switzerland . | |
| 2200870 | 8/1988 | United Kingdom . | |

*Primary Examiner*—Alexander S. Thomas
*Attorney, Agent, or Firm*—Hale and Dorr

[57] ABSTRACT

The invention features a protective strip assembly having a transparent strip of resilient material secured to a mounting member which displays useful safety and directional information. The resilient strip includes a pair of oppositely disposed, inwardly extending latch members, each extending longitudinally of the latch member and located between one of the edge portions and a point 45 degrees away from the mid-line of the body. The mounting member includes a web portion having a pair of oppositely disposed web-latch extensions extending across a chord of the body, substantially parallel to a tangent to the circumference of the body at its mid-line, and at least one leg member extending from the web portion away from the body. An information-conveying tape or similar sheet material is attached to the surface of the web portion which faces the body such that the information is visible through the protective strip. A pair of oppositely disposed base members, each extend from a leg member, away from each other and each terminate in a base latch portion.

10 Claims, 3 Drawing Sheets

INFORMATION-CONVEYING PROTECTIVE STRIP ASSEMBLY

BACKGROUND OF THE INVENTION

This invention relates generally to protective bumper strip assemblies for protecting furniture edges, wall and display case surfaces and the like. In particular, this invention is directed to an improved resilient bumper strip assembly which conveys directional and/or emergency information to an observer.

Protective strip assemblies using resilient strip materials in various types of channels are known in the art, as illustrated in U.S. Pat. Nos. 5,013,596, 4,083,592, and 4,808,451 and the patents cited therein. The protective strip assembly disclosed in each of those patents includes a metal or plastic channel capped by an opaque strip of a resilient material, such as rubber. The channel, which may be roughly rectangular in its outside cross-section, attaches to a surface to be protected. The resilient rubber strip is secured to the channel member and partially surrounds and engages the channel along the channel faces that face generally perpendicular to the surface to be protected.

It is an object of this invention to provide a protective bumper strip assembly which conveys useful directional, emergency or other information to an observer.

It is another object of this invention to provide a protective strip assembly in which the directional, emergency or other information is luminescent, thereby allowing it to be seen in darkness.

It is a further object of this invention to provide a transparent protective resilient strip member which can be used with existing metal, plastic, or graphite composite channels

SUMMARY OF THE INVENTION

This invention relates to a protective strip assembly in which the resilient strip is transparent and a sheet material containing safety and/or directional information is attached to the top surface of the channel such that the information is visible through the protective strip. The strip is secured in and partially surrounds the mounting member and may conceal it. The resilient strip member may be any shape but it is preferably semi-cylindrical body having a pair of circumferentially facing edge portions. The resilient strip includes a pair of oppositely disposed, inwardly extending latch members, each extending longitudinally of the strip and located between one of the edge portions and a point away from the mid-line of the semi-cylindrical body. A chord of the semi-cylindrical strip body, substantially parallel to a tangent to the circumference of the semi-cylindrical body at its mid-line coincides with the extent of the mounting member web-latch extensions. A sheet material containing letters, words or symbols that provide directional, safety or other information is attached to the web portion and is visible through the transparent strip. A pair of oppositely disposed base members, each extend from a leg member, away from each other and each terminate in a base latch portion. Each of the pair of web latch extensions extend toward the semi-cylindrical body adjacent the latch member, between the latch member and the mid-line of the semi-cylindrical body. Each of the pair of base latch portions contact the latch member intermediate its inward extension. The inwardly extending latch members may terminate in a small hook, having its opening on the side of the latch member nearest the base member of the mounting member.

The protective strip assembly of this invention improves over the prior art in that it serves a dual function. The strip assembly not only protects walls and food cases from the impact of shopping carriages in grocery and department stores, but it also functions as a directional and safety system by providing customers with important information such as the location of emergency exits. The directional/safety information may be luminescent so that the information is visible during emergencies where there has been a loss of lighting.

The information-conveying protective strip of this invention is also advantageous because it eliminates the need to have excess signs. It also has the further advantage in that these emergency or directional signs cannot be defaced. It has yet another advantage in that these signs may fit in awkward places that other more conventional signs would not fit.

DETAILED DESCRIPTION OF THE PREFERRED EMBODIMENTS OF THE INVENTION

Figure 1:
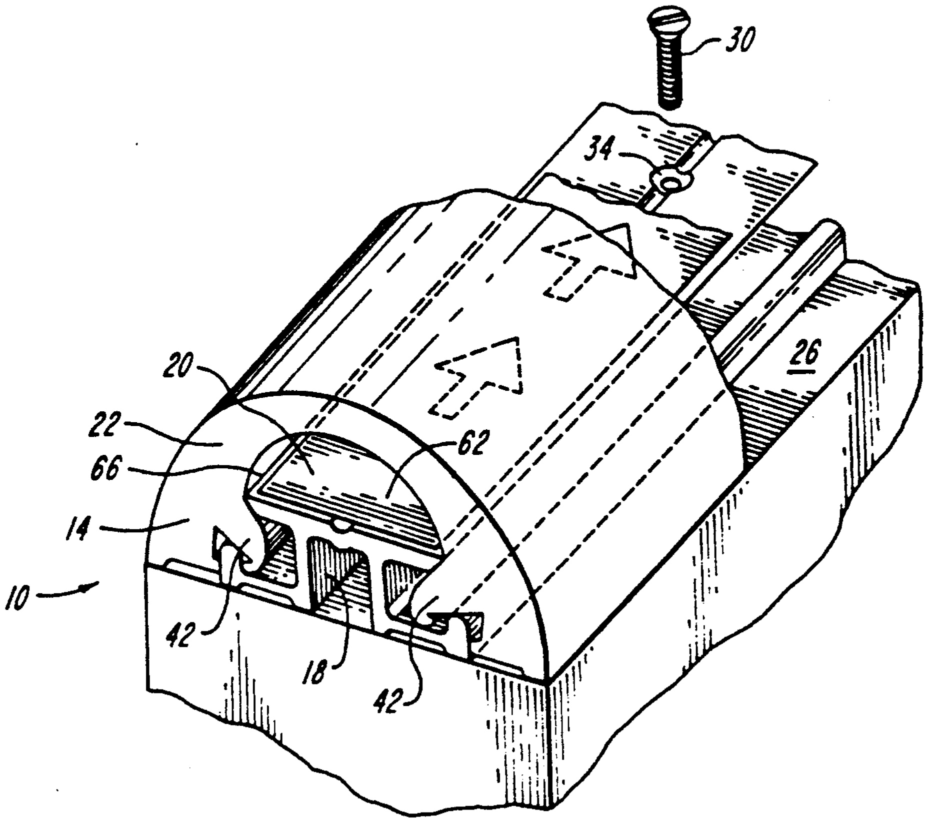
FIG. 1 is a perspective view of a portion of one embodiment of a combined resilient strip and mounting member of the claimed invention with some portions of the resilient strip removed.

Referring to FIG. 1, one embodiment of a resilient strip assembly 10 of this invention is shown in perspective, showing a transparent resilient strip 14 and a mounting member 18 of the claimed invention, with some portions of the resilient strip 14 removed and some portions of the sheet material 20 removed. As used herein, the term transparent shall mean see-through.

The information-conveying means (sheet material 20) containing directional and/or emergency information which is attached to mounting member 18 is visible through transparent strip 14. The resilient strip 14 may be any desired shape but is preferably a semi-cylindrical body 22. When the strip is semi-cylindrical it surrounds the mounting member 18 on three of its four sides. The rubber strip may butt up against the surface to be protected, wholly concealing the channel. It may also be designed such that it only partially conceals the channel. The mounting member 18 may be secured to the surface to be protected 26 by means of mounting screws shown representatively at 30 which secure the mounting member through hole 34. Preferably, the mounting member 18 is secured to the surface to be protected before the sheet material 20 is attached to the mounting member 18. In this way, the mounting screws will be hidden from view. However, it is important to note that the sheet material 20 may be attached before the mounting member 18 is secured to surface 26.

Figure 2:
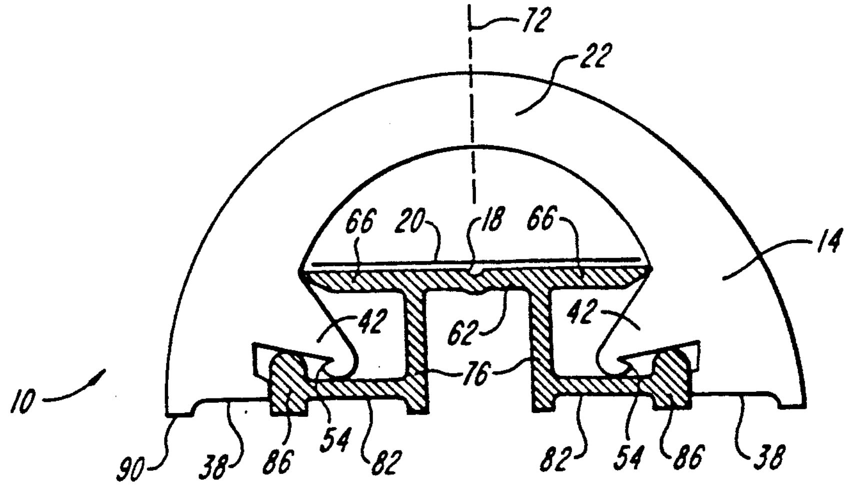
FIG. 2 is a cross-section of one embodiment the resilient strip and mounting member of the invention.

Referring to FIG. 2, it can be seen that when the mounting member 18 and transparent resilient strip 14 are assembled, the web portion 62 of mounting member 18 extends across a chord of the body 22, substantially parallel to a tangent to the circumference of the semi-cylindrical body portion at its mid-line 72. The sheet material 20 which contains the safety, directional or other information is placed on or attached to the surface of web portion 62 which faces resilient strip 14. It is important to note that one or more regions of the web portion 62 may have more than one layer of sheet material attached thereto. For example, the information conveying means may consist of a first layer of colored material and a second layer of transparent material having directional arrows or words at regular intervals. Preferably, the information-conveying means (i.e., sheet material 20) is a single layer of adhesive tape. The sheet material 20 may extend the entire elongation, or a portion thereof, of the mounting member 18. The directional, emergency, or other information is visible through the transparent resilient strip 14.

The sheet material 20 may be chosen from any of a number of materials which include, but are not limited to, adhesive tapes, papers, and thin plastic laminates. In one embodiment, the outer surface of sheet material 20 is printed or embossed with letters, words or symbols which convey emergency, directional, or other information to an observer. For example, the information-conveying protective strip assembly of this invention is used in department stores and supermarkets to protect walls and food storage cases from being damaged by shopping carriages while at the same time providing a directional system which directs customers to emergency exits. The information-conveying protective strip assembly is also used in hospitals or other facilities to protect walls from damage caused by stretchers, carts, and the like while at the same time providing patients and visitors with directional information such as the location of the hospital facilities (e.g., the pharmacy), and emergency information such as the location of fire exits or fire extinguishers. The symbols (e.g., arrows), letters, and words appearing on sheet material 20 are preferably luminescent so that they are visible during emergencies when there is no lighting due to a loss of electric power.

Figure 3:
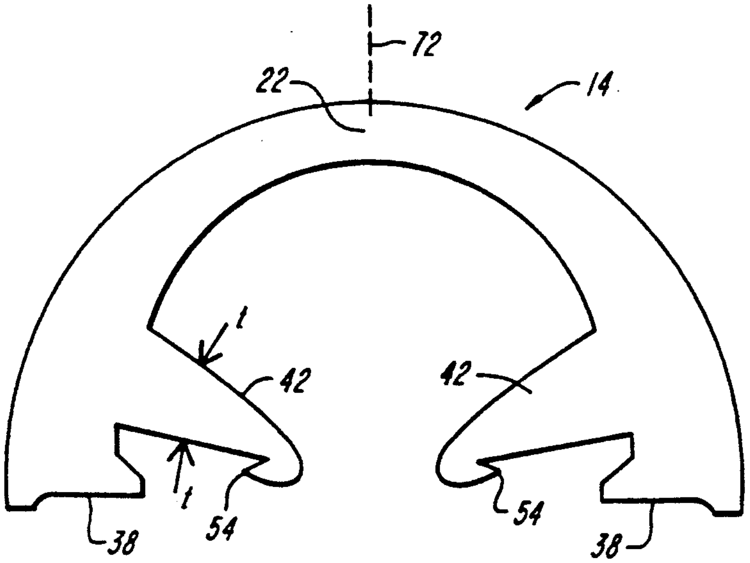
FIG. 3 is a cross-section of one embodiment of the resilient strip of the invention.

Referring now also to FIG. 3, which shows one embodiment of the transparent resilient strip 14 of this invention alone, it can be seen that the semi-cylindrical body 22 is bounded by circumferentially facing edge portions 38. Latch members 42 extend inwardly from the semi-cylindrical body 22 at a location between the edge portions 38 and a point 45 degrees away from the mid-line 72 of the body 22. As shown in FIG. 1, latch members 42 extend longitudinally along the length of the resilient strip 14. Inwardly extending latch members 42 are preferably solid, each terminating in a small hook 54. Hooks 54 facilitate retention of resilient strip 14 by mounting member 18, as explained below.

As shown in the embodiment set forth in FIG. 2, the web latch extensions 66 of the mounting member 18 extend outwardly to a position closely adjacent but inward of an upward projection of the base latch portions 86 and the base latch portions 86 extend upwardly to a position closely adjacent but below an outward projection of the web latch extensions 66.

The latch extensions 66 of the web portion 62 are sized to extend to the body adjacent the inwardly extending solid latch members 42. It is not necessary that the web-latch extensions 66 actually contact the body 22 or the latch members 42. The base latch portions 86 mate with the body 22 adjacent the other side of the inwardly extending latch members 42. Thus, each inwardly extending latch member 42 is located between a respective web latch extension 66 and base latch portion 86.

Engagement of the strip 14 with the mounting member 18 is facilitated due to the generally wedge shape of latch members 42. As the resilient strip 14 is pressed against the mounting member 18, the leading edges of the inwardly extending latch members 42 wedge between web latch member 66 and base latch member 86. The thickness of the inwardly extending latch members 42 (measured between arrows t in FIG. 3) is less than the shortest distance N (FIG. 4) between web latch extension 66 and base latch portion 86, perpendicular to the path of insertion (parallel to the arrows I) of inwardly extending latch member 42. Because the thickness of the latch members 42 is less than N, they insert easily.

Figure 4:
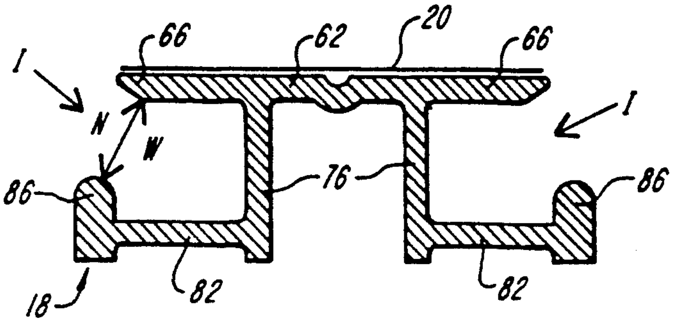
FIG. 4 is a cross-section of one embodiment of the mounting member of the claimed invention.
Figure 5:
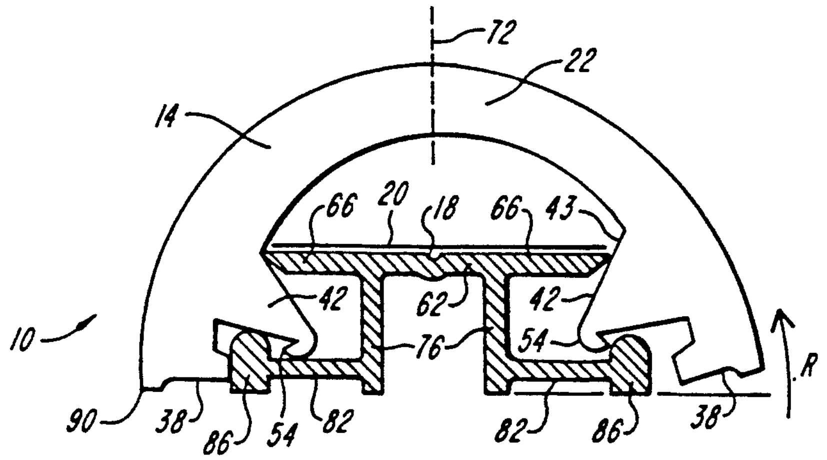
FIG. 5 is a cross-section of one embodiment of the resilient strip and the mounting member of the invention, with the resilient strip shown being forced away along one longitudinal edge.

The manner by which the resilient strip 14 is retained by mounting member 18 will be understood with reference to FIG. 5. In the case of a force or moment in the direction indicated by arrow R tending to remove the resilient strip, the base 43 of inwardly extending latch member 42 contacts the end of web latch extension 66, and tends to pivot about it. At the same time, hook 54 at the end of radial latch member 42 is swung into contact with base latch portion 86, which prevents removal of the latch member 42 from the space W (FIG. 4). Hook 54 is not absolutely necessary, however, it enhances the retention.

The foregoing discussion illustrates the important parameters regarding the size of the inwardly extending latch member 42. They should be long enough so that when a force R is applied and the base 43 of latch member 42 contacts web latch extension 66, the tip of latch member 42 pivots into base latch portion 86 and is retained.

Another embodiment of the mounting member of the invention is illustrated with reference to FIG. 6 and may be used in situations where additional security is required in the engagement of the resilient strip 14 and the mounting member.

Figure 6:
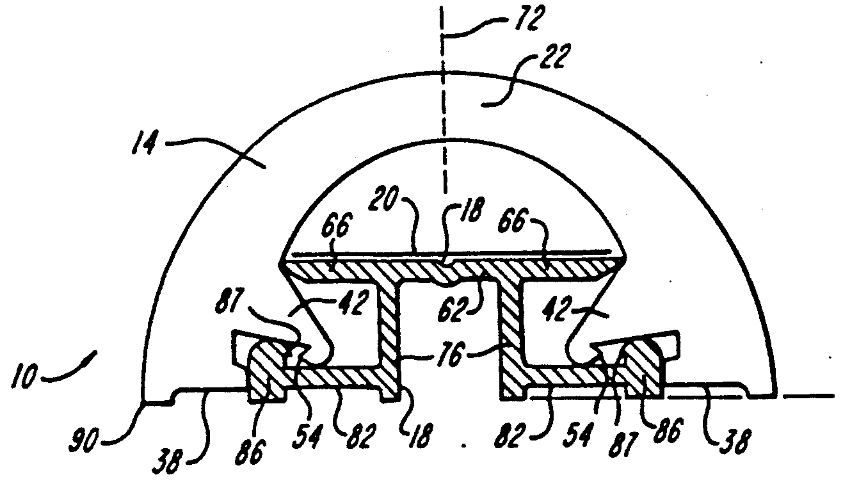
FIG. 6 is a cross-section of one embodiment of the resilient strip and another embodiment of the mounting member of the invention.

As shown in FIG. 6, mounting member 18 is provided with hooks 87 at the ends of base latch portions 86. The open portion of mounting member hooks 87 face the open portion of latch member hooks 54. When the resilient strip 14 is forced away from the mounting member 18, the hooks 54 and 87 engage each other and lock the resilient strip 14 to the mounting member 18.

Figure 7:
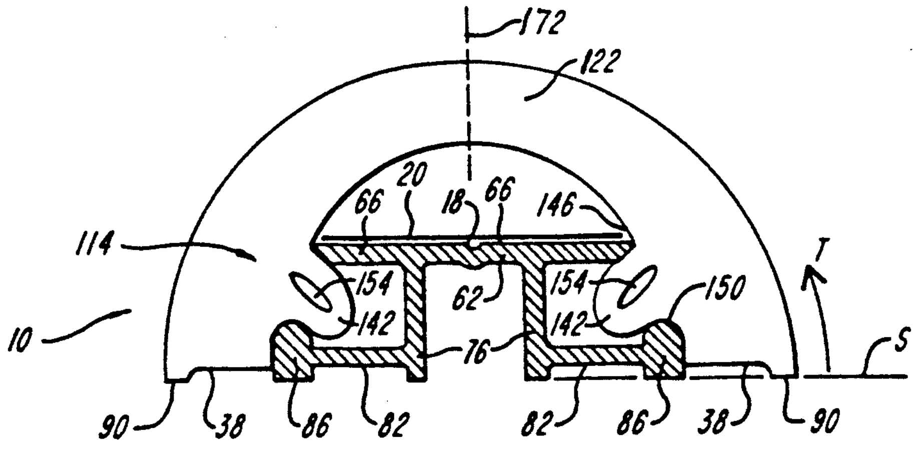
FIG. 7 is a cross-section of another embodiment of the resilient strip of the invention.

Referring now to FIG. 7, which shows another embodiment of a transparent resilient strip 114 and mounting member 18 in cross section, it can be seen that the semi-cylindrical body 122 of the resilient strip is bounded by circumferentially facing edge portions 38. Inwardly extending latch members 142 extend inwardly from the semi-cylindrical body 122 at a location between the edge portions 138 and a point 45 degrees away from the mid-line 172 of the semi-cylindrical body 122. Latch members 142 extend longitudinally along the length of the resilient strip 114. Flanking each radially inwardly extending latch member 142 are a pair of radii 146 and 150. Inwardly projecting latch members 142 are hollow, each having a lumen 154 running along the length thereof. Lumens 154 facilitate assembling and disassembling the strip assembly, by providing a releasable spring retention force, as explained below. The mounting member 18 described above may be used with resilient strip 114.

The web latch extensions 66 of the web portion 62 are sized to extend to the semi-cylindrical body 122 adjacent the hollow inwardly extending latch portions 142. The sheet material 20 which contains the safety, directional or other information is attached to the surface of web portion 62 which faces resilient strip 114. The base latch portions 86 mate with the semi-cylindrical body 122 adjacent the other side of the hollow inwardly extending latch portions 142. Thus, each hollow inwardly extending latch portion 142 is clamped between a respective web latch extension 66 and base latch portion 86. Insertion is facilitated due to the presence of lumens 154, which permit snug retention of the strip 114 in the mounting member 18. As the resilient strip 114 is pressed against the mounting member 18, the leading edges of the hollow inwardly extending latch members 142 wedge between web latch member 66 and base latch member 86, which latch members squeeze together the walls of the hollow inwardly extending latch member 42.

As will be understood, the shortest distance N (FIG. 4) between web latch extension 66 and base latch portion 86, perpendicular to the path of insertion of inwardly extending latch member 42 (parallel to the arrow I), should be smaller than the width of fully expanded hollow latch member 142, to impede removal. Further, the space W beyond the narrowest spot N should be wider than the narrowest distance to permit the inwardly extending latch member 142 to expand after insertion, thereby locking itself in place. The compressibility of the lumens 154 permit this expanding locking engagement.

Additional features of the invention will be appreciated by those skilled in the art. The strip portion may be advantageously made from vinyl, such as polyvinyl chloride. Polyvinyl chloride is non-marking and provides a high degree of impact and abrasion resistance. Although the strip of this invention must be transparent, it may be tinted with virtually any desirable color.

The flush mounted strip assembly may be advantageously used around refrigeration cases, along walls and corridors to protect the walls and corridors from impact due to moving carriages, around checkout counters in grocery and department stores, around island displays in department stores and upon the ends of display cases. The strips protect not only the surface upon which they are mounted, but also objects and persons that may contact those surfaces.

The foregoing description should be taken as illustrative and not limiting in any sense. Other embodiments of the invention will occur to those skilled in the art and are within the scope of the following claims.

What is claimed is:

1. A protective strip assembly comprising, in combination, a mounting member and an elongated strip of resilient material secured in the mounting member;

(a) the resilient strip comprising:
  (1) a transparent body partially surrounding the mounting member; and
  (2) a pair of oppositely disposed, inwardly extending latch members, each located between a point away from the mid-line of the body and the closest edge portion; and (b) the mounting member comprising:
  (1) a web portion having a pair of oppositely disposed web latch extensions extending generally across a chord of the body;
  (2) an information-conveying means attached to a first surface of the web portion;
  (3) at least one leg member extending from a second surface of the web portion away from the body;
  (4) a pair of oppositely disposed base members:
    (i) each extending from a leg member, away from each other;
    (ii) each terminating in a base latch portion; wherein each of the pair of web latch extensions mates with the body adjacent the inwardly extending latch member, between the inwardly extending latch member and the mid-line of the body, and each of the pair of base latch portions mates with the body adjacent the inwardly extending latch member, between the inwardly extending latch member and the closest end portion.

2. The protective strip assembly of claim 1, said inwardly extending latch members terminating in a hook.

3. The protective strip assembly of claim 2, said base latch portions terminating in a hook.

4. The protective strip assembly of claim 1 where the mounting member comprises an elongated channel and the web portion, information-conveying means, web latch extensions, leg members, base members and base latch extensions extend along the channel in the direction of its elongation.

5. The protective strip assembly of claim 4 wherein the web latch extensions are defined by beads which extend along the web portion in the direction of channel elongation.

6. The strip assembly of claim 4 where the base latch portions are defined by beads which extend along the base members in the direction of channel elongation.

7. The protective strip assembly of claim 1 where the information-conveying means is a sheet material having directional or safety information.

8. The protective strip assembly of claim 7, wherein the information conveying means, or portions of the information-conveying means, are luminescent.

9. The protective strip assembly of claim 7, wherein the sheet material is an adhesive tape.

10. The protective strip assembly of claim 1 where the inwardly extending latch member comprises an elongated wedge extending in the direction of elongation of the strip.

* * * * *